UNITED STATES PATENT OFFICE.

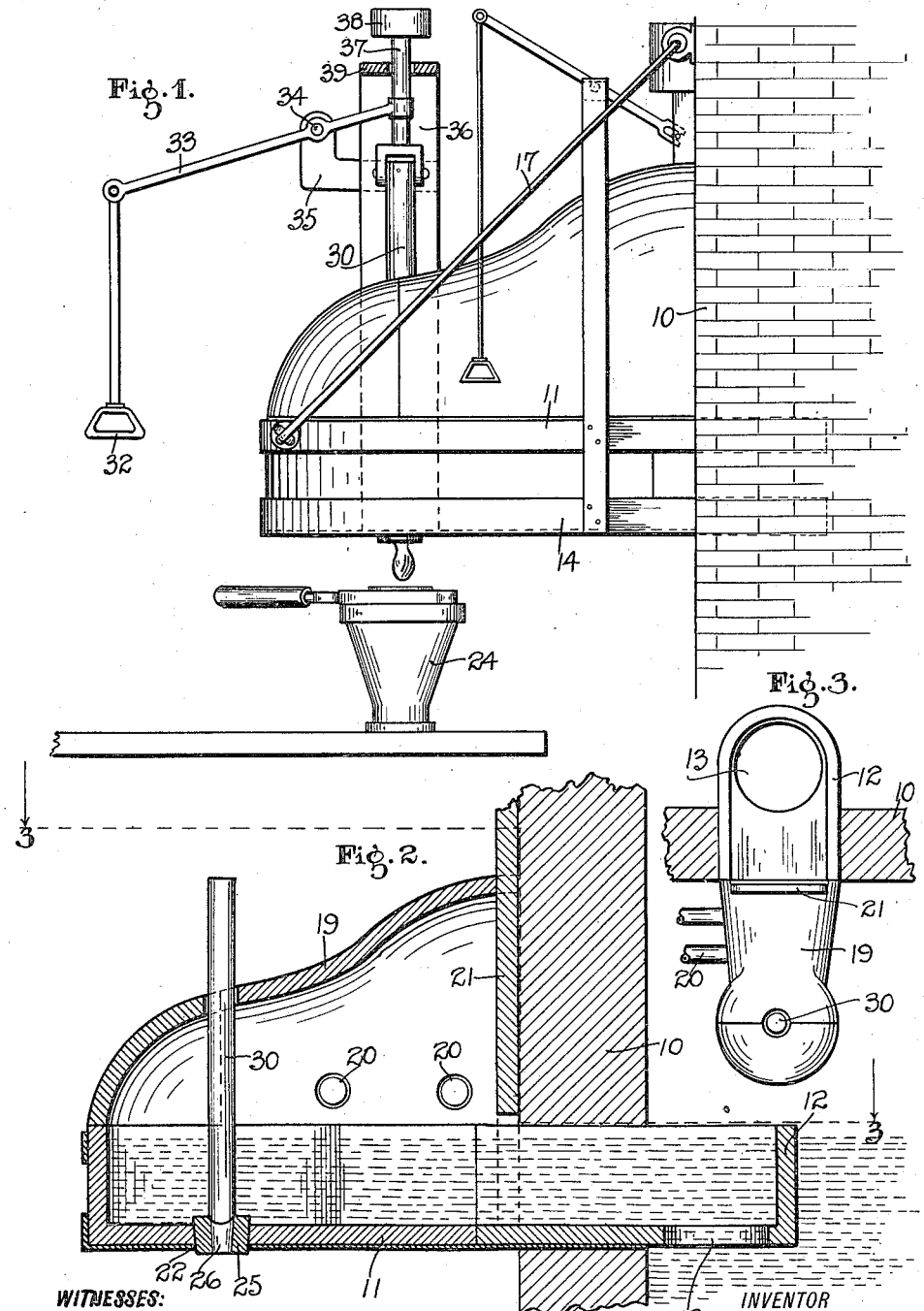

JOHN RAU, OF INDIANAPOLIS, INDIANA.

GLASS-TANK-DISCHARGING MEANS.

1,151,393. Specification of Letters Patent. Patented Aug. 24, 1915.

Application filed February 15, 1913. Serial No. 748,555.

*To all whom it may concern:*

Be it known that I, JOHN RAU, a citizen of the United States, and a resident of Indianapolis, county of Marion, and State of Indiana, have invented a certain new and useful Glass-Tank-Discharging Means; and I do hereby declare that the following is a full, clear, and exact description thereof, reference being had to the accompanying drawings, in which like letters refer to like parts.

The object of this invention is to provide an improved spout or discharge mechanism for glass tanks whereby the glass may flow from the tank and be discharged directly into the mold, and glass gathering be obviated.

The chief feature of the invention consists in providing a spout in which the glass will flow on a level with the glass in the tank and having a discharge opening in the bottom thereof through which the glass may flow directly into the mold below the spout and providing a plunger in the spout for closing said opening, whereby, when it is desired to charge the mold with glass, the plunger is elevated and when sufficient glass has passed through the outlet of the spout, the plunger may be released to close the opening. In other words, the simple operation of the plunger is utilized for controlling the outlet of glass.

Along with the foregoing invention is the further invention of providing the outlet opening for the glass through a removable bushing so that by replacing a bushing with an outlet of different diameter, the outlet can be adjusted to suit the size of the mold and the purpose of the operation of the machine.

Another feature of the invention consists in providing along with the foregoing means, an additional gate or cut off adapted to enter the spout between its ends and where the spout enters the wall of the glass tank for shutting off the flow of glass to the outer portion of the spout for the purpose of changing outlet bushings or any other purpose.

Along with the foregoing is the further idea of applying to the sides of the spout on a level above the glass, heaters for maintaining the glass in the outer portion of the spout in a highly heated condition.

Still another feature of the invention consists in providing a skimmer on the inner end and integral with the spout extending to a point above the level of the glass and not extending below the bottom of the spout and having an opening in the bottom of the spout. In other words, the skimmer consists merely of the spout extending into the tank horizontally beyond the wall with an opening in the bottom of it.

The nature of the invention will be understood from the accompanying drawings and the following description and claims:

In the drawings, Figure 1 is a side elevation of the device. Fig. 2 is a central vertical section through the spout and part of the glass tank, the other parts being omitted. Fig. 3 is a horizontal section on the line 3—3 of Fig. 2.

In detail the drawings herein show a glass tank 10 which may be of any desired construction and into the wall of the glass tank there is a horizontally extending spout 11. The inner portion of the spout extends through the wall 10 of the tank and beyond the wall to form at its inner end a skimmer 12 and within the glass tank there is an opening 13 in the bottom of the spout. The spout is arranged so that the inner end or skimmer 12 will extend a slight distance above the level of the glass within the tank. The spout is made of non-combustible material formed of two sections, an inner and outer section, substantially rectangular in cross section supported by an angle bar 14 extending around the lower edge and a bar extending about the upper edge, as seen in Fig. 1, said bars being embedded at their inner ends in the wall, and the outer end of the upper angle bar being supported by a tie rod 17 that runs to the wall of the tank at a point above the spout, as shown in Fig. 1. The spout has a cover 19 of incombustible material. Not only are the parts of the spout made of incombustible material, but also the same is made of material which is a poor conductor of heat, and through the side walls gas burners 20 enter slightly above the level of the glass so that the outer spout chamber and the glass therein will be heated.

A gate 21 is mounted vertically reciprocably in the outer portion of the spout so that it lies against the outer surface of the wall of the glass tank and extends entirely across the spout and when it is forced downward from the full line position shown in Fig. 2 to the dotted line position, it will divide the spout into inner and outer portions and shut off the flow of glass to the outer portion. Said gate is actuated by a lever 42 fulcrumed on post 43 and having a depending handle cord 44.

The outer portion of the tank has an opening at 22 in the bottom thereof immediately over the position of the mold 24 which is located on the mold support 125. Into the opening 22 a removable bushing 25 is inserted, being slightly tapering downward and having an outlet opening 26 through it of smaller diameter than the bushing. The size of the outlet opening 26 through the bushing is such as is suited for the mold or article being made and bushings 25 with holes 26 of varying diameters are provided so that one can be substituted for another, when desired.

A plunger 30 operates vertically through the cover of the spout and its lower end is oval to fit on a carefully formed seat in the upper end of the bushing for the purpose of closing the discharge opening 26. The plunger is elevated by a handle 32 which is suspended from a lever 33 and said lever is fulcrumed at 34 between its ends to a fulcrum arm 35 extending from a frame 36. The inner end of the lever 33 is secured to a rod 37 having a weight 38 on its upper end and being guided through a horizontal bar 39 on the upper end of the frame 36 and the lower end of the rod 37 is connected with the plunger 30.

In operation the gate 21 is elevated and the plunger 30 is allowed to be closed by gravity and then the glass flows into the outer chamber of the discharge spout until it reaches a level with the glass in the furnace. The glass in the outer chamber is kept highly heated by the burners 20. When the mold is placed in the position shown in Fig. 1, the plunger 30 is elevated and a gather of glass 40 passes therefrom and when it is apparently large enough, the plunger is allowed to descend and close the opening and the gather of glass is sheared off by shears applied to the glass at the underside of the bushing and then the glass drops into the mold. If, for any reason, the bushing 25 becomes worn or the size of the discharge opening 26 should be varied, the gate is closed and the bushing is removed and another one is put in its place.

I claim as my invention:

1. A glass tank discharging means including a spout with an opening in the bottom thereof, a tapering movable bushing adapted to fit in said opening and project above the bottom of the spout, and a plunger vertically movable within said spout and with its lower end of greater diameter than the upper end of the opening in the bushing for engaging the bushings and inclosing the outlet opening therethrough, substantially set forth.

2. The combination with a glass tank with an opening therein, of a spout for conveying the glass therefrom having an inner portion projecting inward through said opening beyond the wall of the tank to a point within the tank and open at the top and with the upper edge of such inner portion adapted to be above the level of the glass and at least as high as the top of the opening through the wall of the tank and with an opening in the bottom of said inner portion and the outer portion of the spout having a discharge opening, a cover for such outer portion, and means within such outer portion for closing and opening said discharge opening therein.

In witness whereof, I have hereunto affixed my signature in the presence of the witnesses herein named.

JOHN RAU.

Witnesses:
J. H. WELLS,
O. M. McLAUGHLIN.